United States Patent [19] [11] 3,830,505
Rabinow [45] Aug. 20, 1974

[54] VERTICAL STABILIZER FOR PHONOGRAPH ARMS

[76] Inventor: Jacob Rabinow, 6920 Selkirk Dr., Bethesda, Md. 20034

[22] Filed: Nov. 22, 1971

[21] Appl. No.: 200,758

[52] U.S. Cl. .............................. 274/1 R, 274/23 R
[51] Int. Cl. .............................. G11b 3/10
[58] Field of Search .............................. 274/1 R, 23 R

[56] References Cited

UNITED STATES PATENTS 3,623,734 11/1971 Toyonaka-shi et al........ 274/23 R X

*Primary Examiner*—Louis R. Prince
*Assistant Examiner*—Charles E. Phillips

[57] ABSTRACT

The present conventional phonograph arm supporting a reproducing cartridge suffers, among other problems, from the difficulty that a warped record or a violent vibration of the whole mechanism can easily throw the cartridge out of contact with the record. The present disclosure is concerned with the addition of arm-position sensors and motor devices to produce the necessary vertical forces to counteract this tendency. Several embodiments of the device are described.

2 Claims, 8 Drawing Figures

INVENTOR

Jacob Rabinow

BY Max L. Libman

ATTORNEY

PATENTED AUG 20 1974 3,830,505

SHEET 3 OF 3

INVENTOR

Jacob Rabinow

BY

ATTORNEY

VERTICAL STABILIZER FOR PHONOGRAPH ARMS

A conventional phono arm used universally today to play phonograph records consists essentially of a balanced or nearly balanced rod carrying a record-playing cartridge at one end and a counterbalance at the other. The cartridge may have a mass of the order of 5 to 10 grams and the effective mass at the cartridge support may add an additional equivalent amount. Since the vertical force on the stylus is today commonly of the order of 1 gram, it can be seen that a vertical downward acceleration of a 20th to 30th of one "*g*" is sufficient to make the stylus leave the record. This effect can be caused either by a warped record or by the fact that the whole phonograph mechanism may be mounted on a flimsy support such as a table or shelf which may be subject to rather violent oscillations as, for example, when people dance in the proximity of the machine.

Various devices have been suggested to overcome the above difficulties. One, of course, is to use a much heavier vertical force, but this results in distortions and excessive wear on both the record and the stylus. Another is to design the cartridge and arm to be as light as possible. There are practical limitations as to what can be done in this direction with conventional devices. Third, records can be flattened by various means to reduce warpage and the vibrations of the whole machine can be minimized by proper spring suspensions and other isolation devices. In my co-pending patent application Ser. No. 146,908 filed May 13, 1971, now U.S. Pat. No. 3,710,741, I show a mechanical counterbalancing scheme for the arm which attacks the problem of the vibrations of the whole mechanism but does not solve the problem of the warped record.

My present invention contemplates, in one of its embodiments, the use of a transducer and an electromagnetic linear motor connected between the arm and its supporting structure and so arranged as to produce a force on the arm which tends to keep the cartridge from changing its position relative to the surface of the record. The signal which is used to drive this electric motor can be obtained either from the stylus itself or from a separate sensor which measures the distance between the record surface and the phono arm. Details of several such mechanisms are described below.

The specific nature of the invention, as well as other objects and advantages thereof, will clearly appear from a description of a preferred embodiment as shown in the accompanying drawings in which.

Figures 1, 1A, 2:
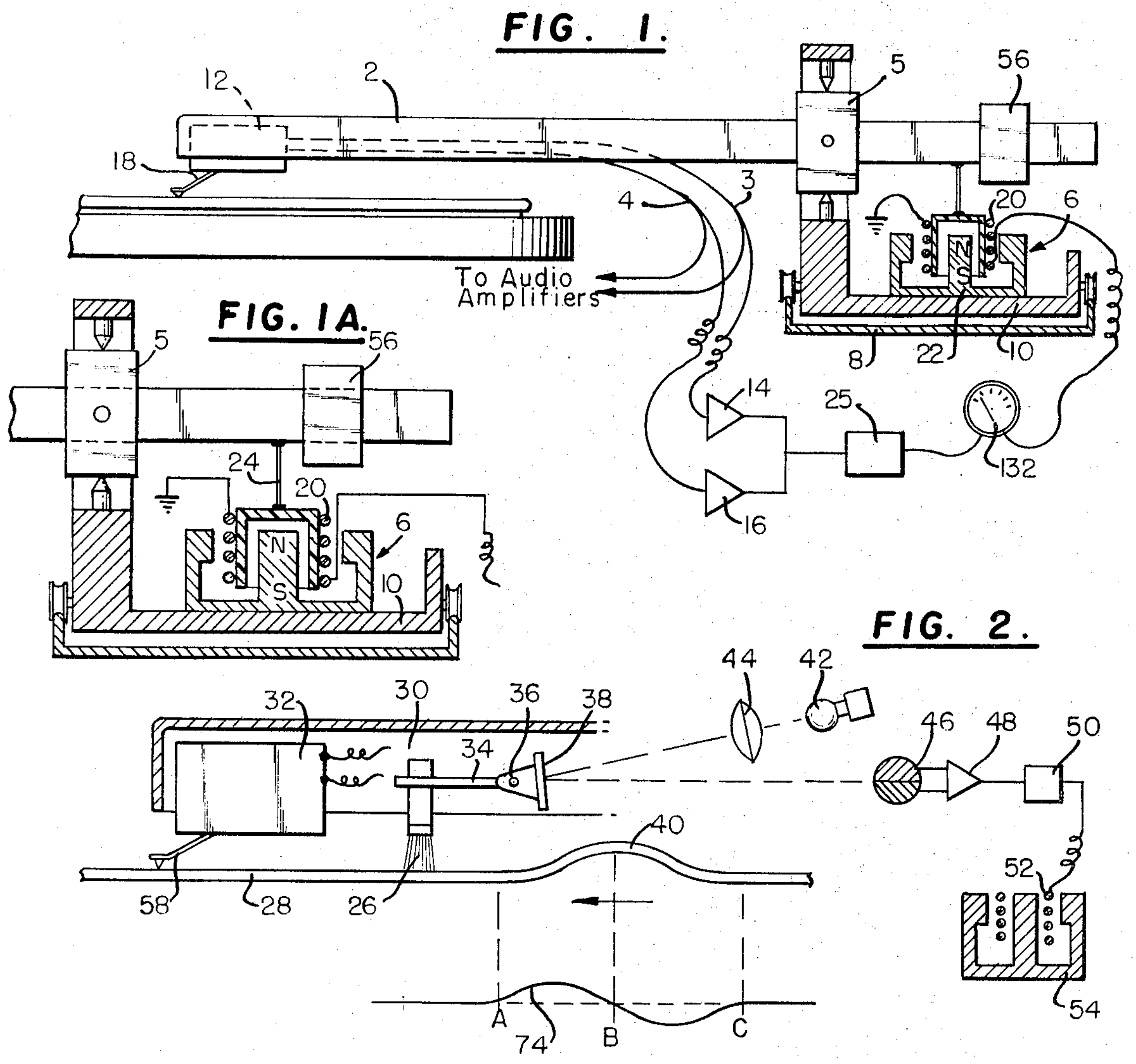
FIG. 1 is a schematic view of a tone arm embodying the invention.
FIG. 1A is an enlarged view of a portion of FIG. 1.
FIG. 2 shows a modification of FIG. 1, employing a brush sensor.

FIG. 1 shows a conventional arm 2 mounted in a gimbal system 5, or other suitable bearings, such as in my U.S. Pat. Nos. 2,915,315 and 3,572,724 and application Ser. No. 142,908 filed May 13, 1971. An electromagnetic linear motor 6 such as used in ordinary electrodynamic loudspeakers is shown coupled to the arm 2. The motor 6 is mounted on a servo-driven carriage 10 which supports the arm 2. Such a servo-driven carriage is shown at 7 and 7' in FIGS. 1 and 4 in U.S. Pat. No. 2,915,315 and at 3 in FIGS. 1 and 2 of U.S. Pat. No. 3,572,724. The servo carriage 10 rides on the track 8 which is part of the main frame of the record player.

As is well known, the present-day stereo cartridge puts out signals on two audio channels. These signals are a function of the lateral and vertical motions of the stylus. For the purpose of my invention I connect the two output of such a cartridge in parallel as far as the vertical motion of the stylus is concerned. I do this by connecting two outputs of the cartridge 12 to two amplifiers 14 and 16 in the proper phase so that when the outputs are connected together, a vertical motion of the stylus causes the motor 6 to produce a proportional force. It should be understood, of course, that the cartridge 12 can be connected to the audio equipment in the usual way at the same time and that the input impedance of the two amplifiers 14 and 16 is high enough so as not to affect the normal audio outputs of the cartridge 12.

The linear motor 6 can be a simple loudspeaker structure having a voice coil 20 and a permanent magnet 22 and can be arranged to produce a vertical force on the arm 2 through a flexible link 24 as can be seen in FIG. 1. Thus, when the coil 20 tends to move down it produces a downward force on the rear end of the arm and a lifting force on the stylus 18, or, when the voice coil 20 tends to move up it produces a downward force on the cartridge 12.

It should be understood that a very sudden application of force by the voice coil 20 on the arm 2 will produce an audio output in the cartridge 12. This is, of course, undesirable. In order to avoid this, a low pass filter can be inserted anywhere in the amplifier circuit or directly in the output of the amplifiers so as to limit the rate at which the current can be applied to the voice coil. It will be obvious to people familiar with servo mechanism theory that the total system of the cartridge 12, the amplifiers 14 and 16, the voice coil 20 and the arm 2 has to remain stable under various conditions of operation and a suitable conventional anti-hunt circuit may be needed and I show it at 25. The theory and design of suitable anti-hunt circuitry is conventional and can be obtained from standard text books on servo mechanisms such as, for example, Chapter VII of "Servomechanism Fundamentals" by Lanfer, Lesnick and Watson, McGraw-Hill Book Company, 1st Edition, 1947.

Figure 6:
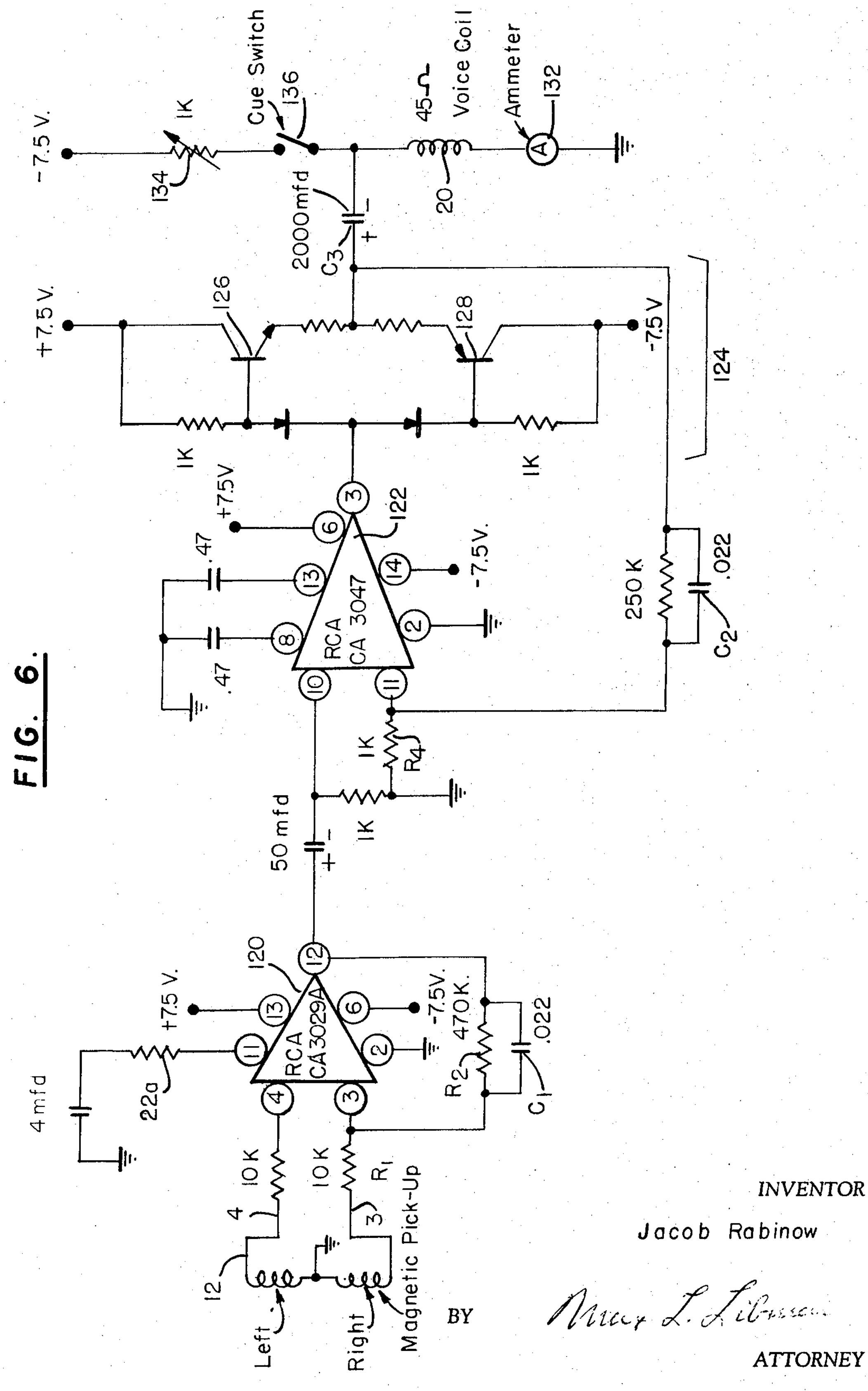
FIG. 6 is a schematic circuit diagram for FIG. 1.

In FIG. 6 I show an actual circuit diagram such as may be used in my servo system. The two stereo output phone cartridge coils are shown at the left of the diagram labeled "Left" and "Right." These coils form no part of this invention but are conventional in all magnetic cartridges made today. This type of pick-up is shown by way of example only. The output of these coils is fed to the differential inputs 3 and 4 of the operational amplifier 120, which combines 14 and 16 of FIG. 1. The numbering of the amplifier connection is in accordance with the manufactuer's labeling of these operational amplifiers. It will be recognized that if the cartridge outputs are fed in parallel one gets the combined or the mono component of the stereo recording but when they are connected in the differential mode, as shown, the amplifier will be driven by the combined vertical components of the recording. This vertical motion of the stylus is used to control the arm of this invention.

The operation of the amplifier 120 is conventional and resistors R1 and R2 form a feedback loop to stabilize the D.-C. gain of the amplifier. The capacitor C1 is used to "roll off" the high frequencies which are not necessary for the operation of my invention. The rest of the amplifier connections are conventional and the operational amplifier that I used in my first experiments is the RCA CA3029A. This amplifier 120 feeds a second operational amplifier 122 which, in turn, drives the complimentary push-pull power amplifier 124 consisting of two transistors 126 and 128 and their associated circuitry. A feedback D.-C. stabilizer loop consisting of resistors R3 and R4 is again used to control the second and third stages of this overall system, with a capacitor C2 to again limit the response of the lower frequencies.

The output of the driving stages 124 is coupled to the coil 20 through a large capacitor C3. An ammeter 132 is connected in series with the coil 20 to show the current that passes through it.

In order to provide a D.-C. bias to the coil 20 that it can be used not only to make the arm 2 (FIG. 1) follow a warped record but to provide the steady state vertical force on the stylus 18, I provide a variable resistor 134 which receives its current from a suitable power supply of −7.5 volts as shown in the diagram. A "cue" switch 136 is shown on the diagram which has the following function. When it is opened, the coil 20 gets no direct current from any source and the arm 2 can be made to be slightly tail heavy so as to lift off the record. When the cue switch 136 is closed, direct current will pass through the voice coil 20 and it will lower the cartridge 12 into contact with the record. By suitably adjusting the resistor 134 and properly calibrating the ammeter 132, any desired vertical force can be applied to the cartridge 12 without having to adjust the counterweight 56 of to use any other mechanism to lower the arm.

To summarize, the AC operation of the whole amplifier is conventional. When the stylus is affected by the warp of the record, that is, when the record surface moves up the stulus 18 moves up against the cartridge 12 and vice versa, it generates voltages to drive the succession of amplifiers 120, 122 and 124 comprising the system. The coil 20 thus gets the correct current to keep the stylus 18 in contact with the record.

The operation of all of the amplifier components is conventional and is shown only by way of example. Other amplifiers using transistors or vacuum tubes can be used to get the same effect. Particular transistors, resistors, capacitors and current supplies are shown only by way of example.

The "cue" switch 136 can also be shunted by a suitable relay so that the arm can be made to lift automatically at the end of the record in a manner similar to that shown in my U.S. Pat. No. 2,915,315 and my copending application Ser. No. 19,639, filed Mar. 16, 1970.

Obtaining the signal for the stabilizing mechanism from the cartridge itself may present some difficulties depending on the output level of the cartridge and the required filtering of the audio signal. I can also use a separate pickup device which only serves my servo mechanism and is isolated from the audio signals.

One method of doing this is shown in FIG. 2. Here a soft brush 26 rides on the record 28 and I show it at a position inside the arm 30 near the cartridge 32. The brush 26 is mounted on a short arm 34 pivoted to the phono arm 30 at 36. A small mirror 38 is mounted on this short arm 34 along with the brush 26. Thus as a record 28 is played, the brush 26 will ride on the record and assuming, for example, a brush ¼ inch wide, it will be seen that the brush will span many grooves and will be essentially free of audio signals. It will perform, incidentally, the function of keeping the record clean, as is done by such record-riding brushes in some phonographs. It will be obvious that if a record warp 40 begins to arrive under the cartridge 32 as seen in FIG. 2, the brush 26 will rise relative to the arm 30 and the angle between the mirror 38 and the arm 30 will change. On the other hand, if the warp 40 rises very slowly and the arm 30 rises with the rising of the record, the geometry of the brush 26 relative to the arm 30 will not change and the angle of the mirror 38 will not change also. To make use of the mirror angle, I project the light from a small bulb-filament 42 by a lens 44 to the mirror 38 and the reflection is made to impinge on a photocell 46 as can be seen in FIG. 2. The output of the photocell is fed to an amplifier 48 which is fed through suitable anti-hunt circuits 50 to the coil 52 of the amplifier 54 as was done formerly in FIG. 1. The light bulb 42 and the photocell 46 can be mounted on the arm 30 itself at a point near or behind the pivot where these members can act as part of the counterweight (56 in FIG. 1) or they can be mounted on the servo carriage 10 of FIG. 1. Such servo-driven carriages are shown in my above-mentioned patents.

One of the advantages of using a separate position pickup such as the brush 26 is that the brush 26 can be mounted ahead of the audio cartridge 32 as shown in FIG. 2 so that the warp 40 of the record 28 appears at the brush 26 before it reaches the stylus 58 so that a small amount of "lead angle" is introduced into the electrical system. This makes it easier to attain the necessary stability in the overall servo system.

While I show a brush 26 actuating a mirror 38 to produce an electrical signal, it should be understood that other suitable transducer may be driven by the brush 26. This may be an electro-magnetic signal generator, a vane acting as an optical shutter or any well-known position or velocity sensor. The mirror has the obvious advantage of being simple and having very little mass but is used only by way of example.

Figure 3:
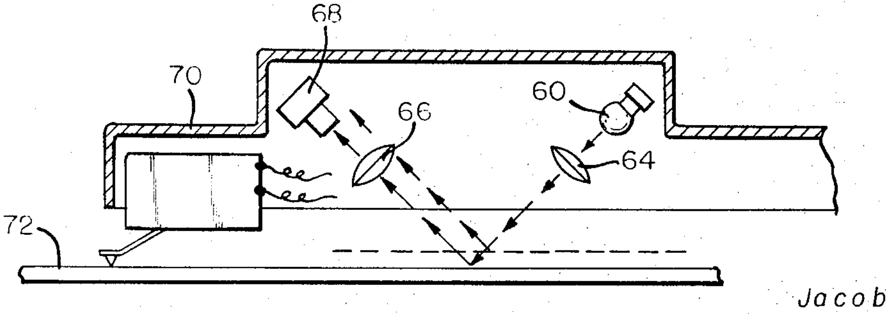
FIG. 3 shows another modification, employing an optical sensor.

Another method of picking up the arm-record distance information is to use a purely optical system to measure the distance between the arm and the record surface. The general scheme is shown in FIG. 3 where a source of light such as the filament of a small bulb 60 is projected onto the surface of the record 72 by a lens 64 and the reflection of this light is focused by another lens 66 onto a three-element photocell 68. A change of distance between the arm 70 and the record surface 72 will change the position of the filament spot on the photocell 68, as can be seen by dotted lines in FIG. 3. The output of the photocell 68 is fed to suitable amplifiers and thence into magnetic motor or coil, as before, to control the force on the arm 70 as shown in the two prior embodiments. This technique of measuring distance between an object and a reflective surface is widely used in automatically focused slide projectors today. U.S. Pat. No. 3,342,102 shows the details of this technique.

Since I am interested only in the change of position rather than the absolute position of the arm relative to the record, the problem is somewhat easier than that which is faced in slide projectors where exact position of a reflecting surface must be maintained. For example, a simple photocell which is only partially illuminated by the light is sufficient for the embodiments of FIGS. 2 and 3 and the amplifiers 14 and 16 can be of the AC type so that when the light is changing (that is, either covering more or less of the photocell) the driving mechanism 54 of FIG. 2 drives the arm 30 or 72 in the direction to counteract this change in light. The point to which the system settles when there is no disturbing motion will be determined, in such AC coupled systems, only by the stiffness of the stylus and the force upon it.

In playing warped records or in trying to follow a badly "jumping" record, the usual cartridge today is not affected too seriously by an upward motion of the record surface since that temporarily only increases the pressure on the stylus, but the cartridge is very badly affected by the sudden dropping of the record surface because that can cause the stylus to leave the groove with great distortion and complete loss of tracking of the particular groove. I can make use of this lack of symmetry by using a unidirectional drive on my coil which does not get any signal when the cartridge is being moved up, that is, closer to the record, but receives a signal only when the record is dropping away from the cartridge. A record warp such as shown in FIG. 2 would produce a vertical signal shown by the line 74 in the same Figure. If the amplifier has a rectifier at its output, the left portion of the curve (A to B) will have no effect on the coil 52 but the portion B to C will produce a signal to drive the arm 30 down as the record surface moves down.

It should be noted that the type of servo mechanism described above acts to reduce the effective or apparent mass of the arm and cartridge and if carried to extreme can produce a negative effect, that is, make the cartridge behave so as to have no mass and therefore float off the record. This can be prevented by suitable amplifier gain controls.

It should be noted also that a fast acting servo can tend to minimize low frequency vertical rumble of the turntable, if this rumble is in the pass-band of the servo system.

Figure 4:
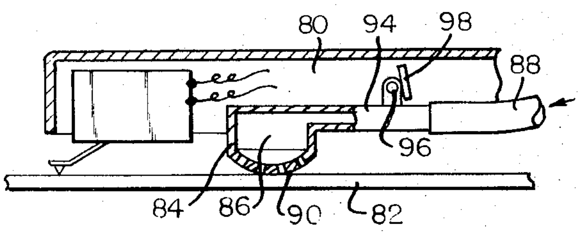
FIG. 4 shows still another modification employing a pneumatic sensor.

In FIG. 4 I show another type of transducer for measuring the relative position between the arm 80 and the record surface 82. This is a pneumatic transducer 84 which consists of a small chamber 86 to which air is supplied by a flexible tube 88 from a suitable pump or other source of compressed air. The small chamber 86 has a perforated bottom plate 90 which contains one or more small holes 92, or the bottom surface 90 can be made of porous material such as sintered metal. Air under pressure will flow through these openings and support this sensing chamber 86 just above the surface of the record 82. The chamber 86 is mounted on a short lever arm 94 which is pivoted at 96 to the phono arm 86 in a manner similar to the bush-support construction in FIG. 2. A small mirror 98 is mounted on this supporting lever arm 94 and the whole mechanism acts exactly in the manner for the construction in FIG. 2.

Figure 5:
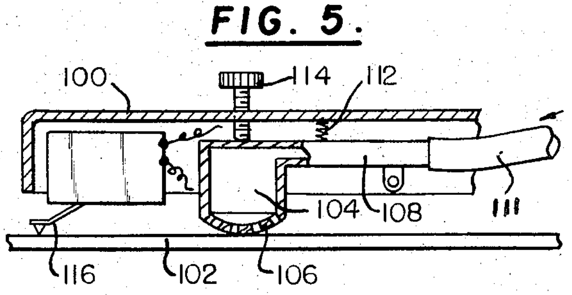
FIG. 5 shows another form of pneumatic sensor.

In FIG. 5 I show a construction which not only senses the position of the arm 100 relative to the record 102 but also supplies the supporting force for maintaining the correct geometry between the arm 100 and the record 102. Here a somewhat larger chamber 104 having a bottom perforated surface 106 is mounted on the lever-arm 108 by a pivot at 110 which is, in turn, mounted in arm 100. Again, a flexible hose 111 connects the chamber 104 with a source of air pressure. A short tension spring 112 tends to lift the chamber 104 vertically away from the record 102 as shown in FIG. 3, while the adjusting screw 114 acting against this spring 112 is employed to position the chamber 104 rigidly in the arm 100 so that during the operation of the arm 100 the air bearing, consisting of the perforated plate 106 and the record surface, keeps the arm 100 at a constant height above the record 102. It should be recognized that this adjustment has to be made very carefully so as to produce the desired vertical force on the cartridge stylus 116.

In the embodiment of FIG. 5 no other motor means are needed to stabilize the phono arm 100 and, in fact, the counterweight which is commonly used with phono arms (56 in FIG. 1) can be eliminated since the air pressure can be made large enough to support the full weight of the arm and cartridge. In order to conserve air supply however, it would normally be preferable to use a counterweight so that the amount of air required to maintain the desired position of the arm could be kept at a low value.

Figure 7:
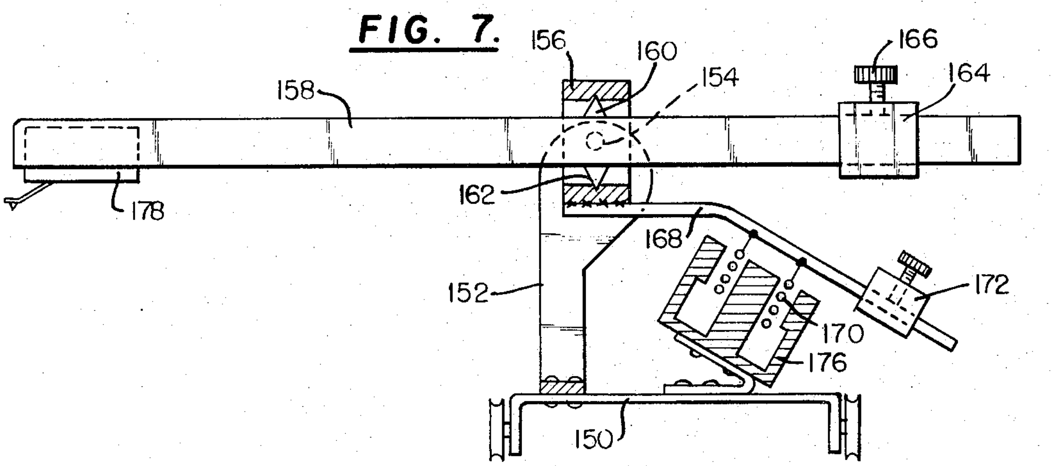
FIG. 7 shows a modified form of motor mounting for the tone arm.

FIG. 7 shows still another embodiment of my invention. The servo carriage 150 such as mentioned above (8 in FIG. 1) carries a U-shaped bracket 152. I show only one-half of this bracket for clarity. This bracket 152 carries two horizontal pivots 154 which support a gimbal ring 156. Passing through the gimbal ring 156 is the phonoarm 158 which has vertical pivots 160 and 162 journaled in this ring 156. A counterweight 164 controlled by a knurled set screw 166 is mounted on the back of the arm 158.

Rigidly fastened to the bottom of the gimbal ring 156 is a metal bracket 168 to which is rigidly attached a coil 170. An alternate counterweight 172 is slidably mounted on the bracket 168. It may be used instead of the counterweight 164 or as a supplement thereto. It also has a knurled set screw to fix its position. The coil 170 is located in the magnetic gap of a conventional loudspeaker structure 176. Magnetic structure 176 is also mounted on the servo carriage 150.

It will be seen that the gimbal ring 156 can rotate about the horizontal pivots 154 relative to the carriage 150 of the machine. The phonoarm 158 can rotate horizontally about its vertical pivots 160 and 162 as it plays a record, and the servo system, as described in U.S. Pat. No. 3,572,724, is used to make the carriage 150 follow the arm 158 as it plays the record. The servo can be controlled by a photocell as shown in my U.S. Pat. No. 3,572,724, FIG. 8, or I can use servo contacts such as also shown in the same patent at FIGS. 1 and 5.

It will be seen that the force developed along the axis of the coil 170 will rotate the gimbal 156 about its horizontal pivots 154 and this will also move the cartridge 178 up or down. Thus the same arm control action that was achieved by the prior embodiments can be accomplished by the design of FIG. 7 except that the coil 170 acts on the gimbal 156 and not on the arm 158 directly. Since in my servo-driven arm system the arm is always essentially in line with the gimbal ring, the motion of the gimbal ring 156 is transmitted directly to the arm 158 and accomplishes the results I seek. The embodiment of FIG. 7 has the advantage that the coil 170 is mechanically well positioned relative to the carriage 150 and therefore relative to the magnetic gap in the magnetic structure 176.

While I show linear motors, such as voice coils, in the various embodiments illustrated, it should be understood that other types of motors can be used. For example, rotary actuator of various types can be coupled to the arms or gimbals to accomplish the same result.

I claim:

1. a. A phonograph record reproducing device comprising a pickup unit including a cartridge containing a stylus for playing a disc record, and support means for holding the cartridge in position for playing a record;

b. means to support the cartridge a predetermined distance from a record being played,
c. means to detect deviation from said distance,
d. and power means acting on said support means and responsive to said deviation,
e. said power means being controlled by said deviation detecting means,
f. said power means being arranged to apply a force to the support means such as to control motion of the cartridge only in a direction perpendicular to the plane of the record,
g. said deviation detecting means being mounted on said pickup unit in advance of said stylus so as to detect a change in distance of a portion of the record surface to the support means before the stylus reaches this portion.

2. a. A phonograph record reproducing device comprising a pickup unit including a cartridge containing a stylus for playing a disc record, and support means for holding the cartridge in position for playing a record;

b. means to support the cartridge a predetermined distance from a record being played,
c. means to detect deviation from said distance,
d. and power means acting on said support means and responsive to such deviation to oppose such deviation,
e. said support means permitting the cartridge to move in a direction perpendicular to the record and said means to detect deviation comprising means for producing an electrical output which is a function only of the motion of the cartridge perpendicular to a record being played,
f. said power means including motor means responsive to said electrical output,
g. said motor means being a single voice coil of an electric speaker used as a linear motor and mounted so as to apply a force to the support means in a direction perpendicular to the recorder, h. including means for supplying direct current to said voice coil and variable resistance means for manually controlling said direct current to thereby control the static vertical pressure of said cartridge on a record being played.

* * * * *